United States Patent [19]

Robinson

[11] Patent Number: 4,579,500
[45] Date of Patent: Apr. 1, 1986

[54] EQUALIZER FOR TAILGATE LIFTS
[76] Inventor: Morris D. Robinson, 179 Via Los Miradores, Redondo Beach, Calif. 90277
[21] Appl. No.: 625,465
[22] Filed: Jun. 28, 1984
[51] Int. Cl.[4] .............................................. B60P 1/44
[52] U.S. Cl. ................................ 414/545; 296/57 R; 187/9 R
[58] Field of Search ..................... 296/57 R, 57 A, 58, 296/61, 62, 50; 414/545; 187/8.59, 9 R
[56] References Cited

U.S. PATENT DOCUMENTS

| | | | |
|---|---|---|---|
| 3,204,926 | 3/1962 | Nolden | 414/545 |
| 3,275,170 | 9/1966 | MacRae et al. | 296/57 R |
| 4,408,948 | 11/1983 | Robinson | 414/545 |
| 4,457,401 | 7/1984 | Taylor et al. | 187/8.59 |

Primary Examiner—Robert R. Song
Attorney, Agent, or Firm—Donald D. Mon

[57] ABSTRACT

A truck lift gate has a platform which is raised and lowered on runners to which it is attached, and which are guided in vertical rails. The runners are lifted by flexible members such as chains or cables, and are lowered by their own weight when the flexible members are slacked off. An equalizer is carried by each runner which overhangs and contacts the top of the platform at an elevation relative to the horizontal which is respective to the platform when it is horizontal. Then the platform cannot tilt sidewise when it is lowered.

8 Claims, 4 Drawing Figures

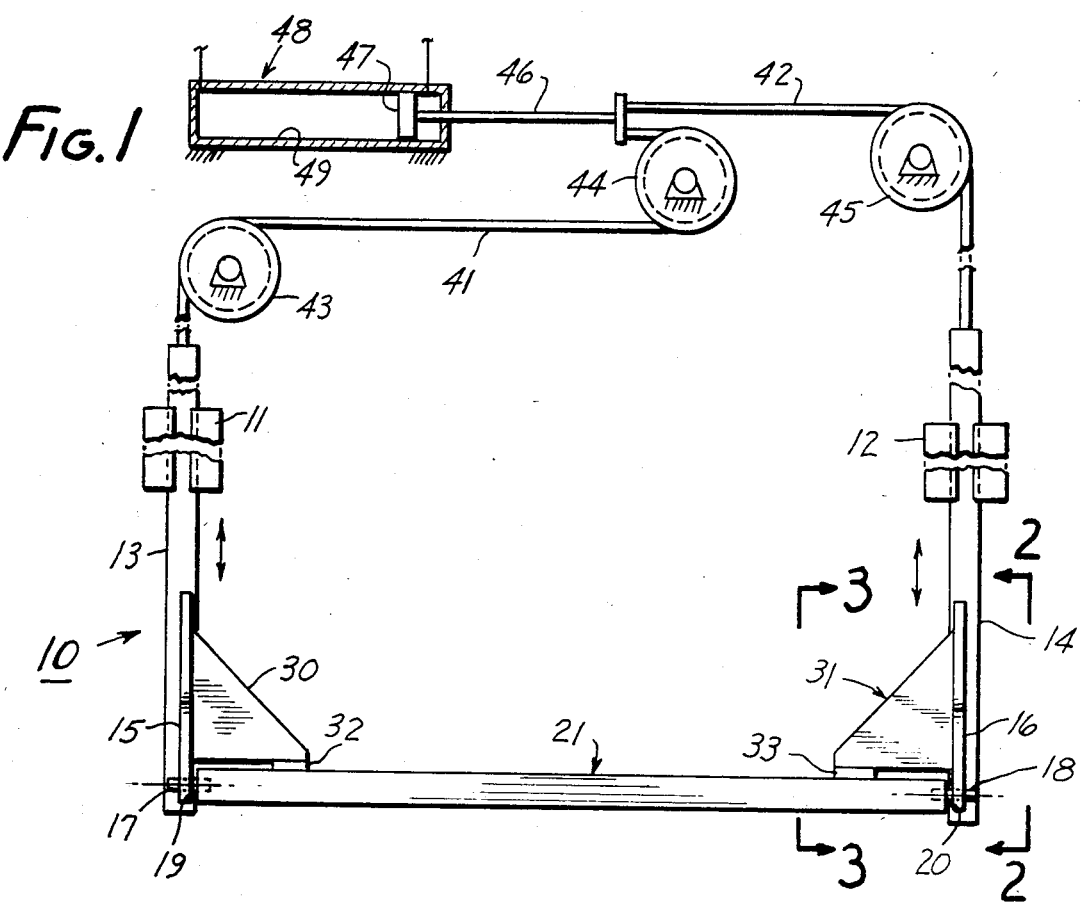
Fig.1
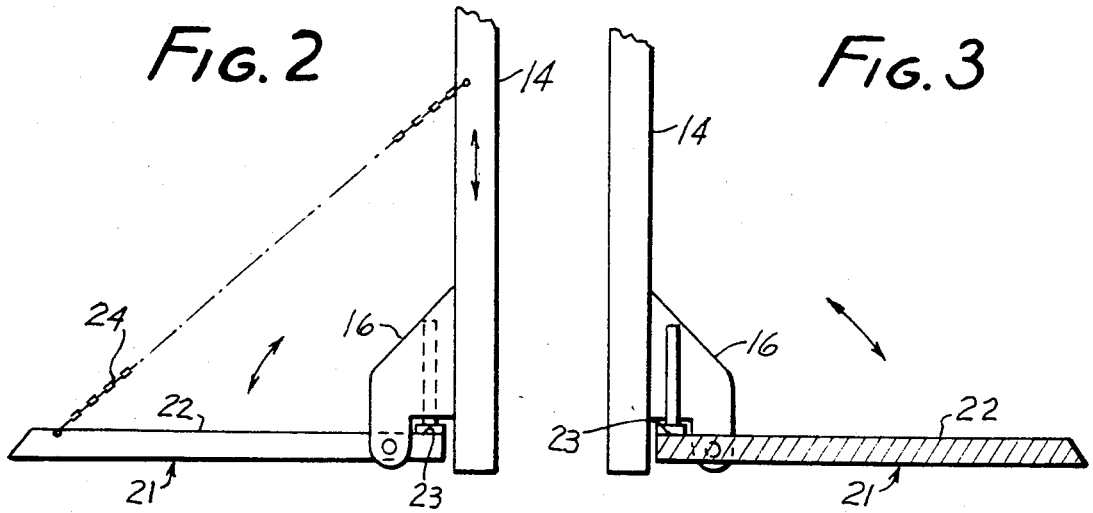
Fig.2  Fig.3
Fig.4

EQUALIZER FOR TAILGATE LIFTS

FIELD OF THE INVENTION

This invention relates to lift gates of the type which can be mounted to a truck bed to lift and lower loads relative to the level of the truck bed, and which includes runners that are raised by chains and which descend by their own weight.

BACKGROUND OF THE INVENTION

This invention relates to lift gates of the type which can be mounted to a truck so as to raise and lower loads to and from the truck bed. The type of lift gate with which this invention is principally concerned has vertical rails at each side, which guide and support vertically slidable runners, to which a platform is pivotally mounted. The platform can be pivoted between a horizontal load-carrying position and an upright stored position. As a unit it is raised by pulling up the runners with a flexible member such as a chain or cable attached to each runner, and lowered by slacking off the flexible members.

This is a sound and useful construction which performs well. When the runners are pulled up, their elevations along the rails are accurately related to each other, because both chains are equally pulled, and are in tension. However, when the runners are lowered, there is no direct means coordinating them. Instead, the combined weight of the platform and the runners is relied on to keep both flexible members taut, which if it occurs will result in the platform's lowering properly. This does in fact occur under most circumstances, and definitely when the platform is loaded. However, it may occur when the platform is lowered unloaded or very lightly loaded that the grease which lubricates the rails is dirty, or congealed on a cold day, and there could be sufficient difference in resistance to sliding that one of the runners could lag behind the other. Then there could be some undesirable sideward tilt. It is an object of this invention to provide simple means to assist in keeping the platform level even if one of the runners tends to lag behind the other.

BRIEF DESCRIPTION OF THE INVENTION

A lift according to this invention includes a pair of vertical, parallel, spaced apart rails adapted to be mounted to a truck bed. A runner is slidably mounted to each rail for vertical movement. Each runner has a hinge joint to support a platform between them so it will raise and lower with the runners, and can be pivoted between a horizontal load-carrying position and an upright, stored position.

A pair of chains is provided, one for each of the runners. Actuator means, such as a hydraulic cylinder-piston assembly, is connected to the flexible member so as to pull on them to raise the runners, and to slack off the members to enable the runners to lower as a consequence of their and the platform's weight.

Equalizer means is mounted to each of said runners, and provides contact means contactible by the platform. The point of contact is spaced laterally from the hinge-mountings of the platform so that, together with the hinges, at least one of the equalizer means will urge the platform toward a level position.

The above and other features of this invention will be fully understood from the following detailed description and the accompanying drawings, in which:

BRIEF DESCRIPTION OF THE DRAWINGS

FIG. 1 is a rear elevation showing the invention;

FIGS. 2 and 3 are views taken at lines 2—2 and 3—3, respectively, in FIG. 1; and FIG. 4 is a schematic showing of the problem solved by this invention.

DETAILED DESCRIPTION OF THE INVENTION

FIG. 1 shows a tailgate lift assembly 10 adapted to be attached to the rear end of a truck bed (not shown). Vertical rails 11, 12, of suitable length are fixed to the truck bed. They are parallel, vertical, and laterally spaced from one another. They receive and guide respective runners 13, 14, which slide vertically in the rails.

Runners 13, 14 carry respective identical hinge plates 15, 16, which are identical to one another. A hinge pin or other bearing means 17, 18, pivotally supports a respective edge 19, 20 of a platform 21. The hinge pins have axes which are coincident when the system functions correctly. Platform 21 has a load carrying portion 22 rearwardly of the pivot, and a projection 23 forwardly of the pivot. The platform may be lowered to the horizontal load-bearing position shown in the drawings, or tilted up to an upright, stored position aligned with the rails, where it acts as a gate. If desired, support chains 24 can be provided to support the rearward end of the platform when level.

Equalizer means 30, 31 are respectively attached to runners 13, 14. These are preferably buttress shaped flat plates welded to the runners, which support downwardly-facing contact pads 32, 33 that are disposed laterally of the hinges. They are also preferably disposed forwardly of the hinge line so they will not interfere with the platform when it moves to its stored position.

Actuator means 40 to raise the runners and permit them to lower comprises a pair of flexible members 41, 42 such as chains or cables, that are attached to the supports. Chain 41 bends around idlers 43, 44. Chain 42 bends around idler 45. Both chains connect to a piston rod 46 that is moved by the piston 47 of a piston-cylinder assembly 48. The assembly includes a cylinder 49, and a suitable hydraulic circuit (not shown) for power means.

The entire tailgate assembly has a main frame (not shown) to which the rails are mounted, and which is attached to the truck frame or bed. The cylinder is mounted to the main frame. Moving the piston to the left in FIG. 1 pulls on the flexible member to raise the runner. Moving it to the right slacks off the flexible members and permits the runners to lower.

The problem solved by this invention is shown in FIG. 4. Hinge plates 15, 16, representing also the runners, are shown at different elevations. Hinge plate 15 has lagged because of excessive friction or some other reason, and this has tilted the platform relative to the horizontal 50. This tilting which is undesirable, is possible because in practical structures of this type there will always be substantial play at the bearings. Incidentally, the chain connected to runner 13 (to which plate 15 is mounted) will be slack, while the other is taut. This condition can exist only during downward movement.

The purpose of this invention is to prevent the FIG. 4 situation from occurring, and this is accomplished by the equalizer means. With them installed, the illustrated condition cannot occur. The contact pad 33 of means 31 is shown in dashed line on the position it would occupy. If present, it would not permit the top of the platform to rise higher than its lower face, relative to the hinge plane (shown as horizontal line 50). Thus, when the platform is lowered, and one runner lags, the equalizer means on the "leading" runner bears against the platform and keeps it level. This either slows the leading runner, or more likely applies a torque to the platform which will add a downward force to the lagging runner, causing it to speed up. In either event, the condition of FIG. 4 is prevented, and the lowering platform while in its load-carrying position, cannot appreciably tilt sidewardly.

This invention is not to be limited by the embodiment shown in the drawings and described in the description, which is given by way of example and not of limitation, but only in accordance with the scope of the appended claims.

I claim:

1. A tailgate lift comprising;

a pair of upright, parallel, spaced apart rails;

a pair of runners, each one slidably mounted to a respective one of said rails for parallel movement along said rails;

a platform;

a pair of hinge means, each having a hinge axis mounting said platform to a respective one of said runners for tilting movement between a horizontal load-carrying position and an upright storage position, and for up and down movement with said runner;

actuator means including a pair of inelastic flexible members, each one connected to a respective one of said runners, and power means to pull on said flexible members to raise said runners, and to slack off said flexible members to permit said runners to lower; and rigid equalizer means rigidly mounted to each of said runners, each equalizer member having a contact portion facing downwardly toward said platform, spaced laterally from said hinge means, and disposed at an elevation so as to contact the top of said platform when said platform is substantially horizontal in the sense that the axes of said hinge means are coaxial, and said runners are at substantially the same elevation, whereby to resist sidward tilting of said platform if one runner tends to lag behind the other during lowering of the runners.

2. Apparatus according to claim 1 in which said equalizer means comprises plates disposed parallel to the rails and parallel to the axis of the hinge means.

3. Apparatus according to claim 1 in which said flexible members are chains or cables.

4. Apparatus according to claim 1 in which said power means comprises a piston-cylinder assembly with a piston rod to which both of said flexible members are connected.

5. Apparatus according to claim 4 in which said power means comprises a piston-cylinder assembly with a piston rod to which both of said flexible members are connected.

6. Apparatus according to claim 1 in which said contact portions are spaced from said hinge axis.

7. Apparatus according to claim 6 in which said platform has an upwardly-facing load-carrying area on one side of said hinge axis, and an upwardly-facing contact area on the other side of said hinge axis, said contact portion being spaced from said hinge axis, facing downwardly, where it will contact said contact area when the platform is substantially horizontal.

8. Appratus according to claim 2 in which said platform has an upwardly-facing load-carrying area on one side of said hinge axis, and an upwardly-facing contact area on the other side of said hinge axis, said contact portion being spaced from said hinge axis, facing downwardly, where it will contact said contact area when the platform is substantially horizontal.

* * * * *